US009329012B2

(12) United States Patent
Neugaertner

(10) Patent No.: US 9,329,012 B2
(45) Date of Patent: May 3, 2016

(54) FOLDING RULE

(71) Applicant: Mario Neugaertner, Eckstedt (DE)

(72) Inventor: Mario Neugaertner, Eckstedt (DE)

(73) Assignee: Mario Neugärtner, Eckstedt (DE)

( * ) Notice: Subject to any disclaimer, the term of this patent is extended or adjusted under 35 U.S.C. 154(b) by 64 days.

(21) Appl. No.: 14/388,050

(22) PCT Filed: Mar. 20, 2013

(86) PCT No.: PCT/EP2013/055784
§ 371 (c)(1),
(2) Date: Sep. 25, 2014

(87) PCT Pub. No.: WO2013/143932
PCT Pub. Date: Oct. 3, 2013

(65) Prior Publication Data
US 2015/0033569 A1 Feb. 5, 2015

(30) Foreign Application Priority Data
Mar. 30, 2012 (DE) .......................... 10 2012 205 302

(51) Int. Cl.
*G01B 3/06* (2006.01)
*G01B 5/08* (2006.01)
*G01B 5/213* (2006.01)

(52) U.S. Cl.
CPC .. *G01B 3/06* (2013.01); *G01B 5/08* (2013.01); *G01B 5/213* (2013.01)

(58) Field of Classification Search
CPC .. G01B 3/06; G01B 2003/1094; G01B 3/004; G01B 3/10; G01B 3/1082; G01B 3/1084; G01B 11/00; G01B 3/08
USPC .................................................. 33/458, 459
See application file for complete search history.

(56) References Cited

U.S. PATENT DOCUMENTS

| 1,320,689 | A | * | 11/1919 | Hart | ......................... | G01B 3/56 33/459 |
| 1,674,882 | A | * | 6/1928 | Bloomfield | .............. | G01B 3/06 33/498 |
| 1,680,566 | A | | 8/1928 | Parker | | |
| 2,607,995 | A | * | 8/1952 | Butler | ...................... | G01B 3/06 33/458 |
| 2002/0178599 | A1 | * | 12/2002 | Smola | ...................... | G01B 5/08 33/555.1 |
| 2015/0033569 | A1 | * | 2/2015 | Neugaertner | ............ | G01B 3/06 33/458 |

FOREIGN PATENT DOCUMENTS

| CH | 439768 | 7/1967 |
| CN | 201104191 | 8/2008 |
| DE | 834904 | 3/1952 |
| GB | 191022331 | 6/1911 |

OTHER PUBLICATIONS

International Search Report for PCT/EP2013/055784, English translation attached to original, Both completed by the European Patent Office on Apr. 16, 2013, All together 5 Pages.

* cited by examiner

*Primary Examiner* — Yaritza Guadalupe-McCall
(74) *Attorney, Agent, or Firm* — Brooks Kushman P.C.

(57) ABSTRACT

A folding rule including at least three links that are pivotably fastened to each other, at least one of the links has a scale for measuring the diameter of objects, the scale is designed in such a way that, when the object is completely enclosed by three adjacent links wherein the insides of the three links are each in contact with the object, a specified region of one of the links is in contact with the scale and a respective contact point on the scale indicates the diameter of the object.

10 Claims, 1 Drawing Sheet

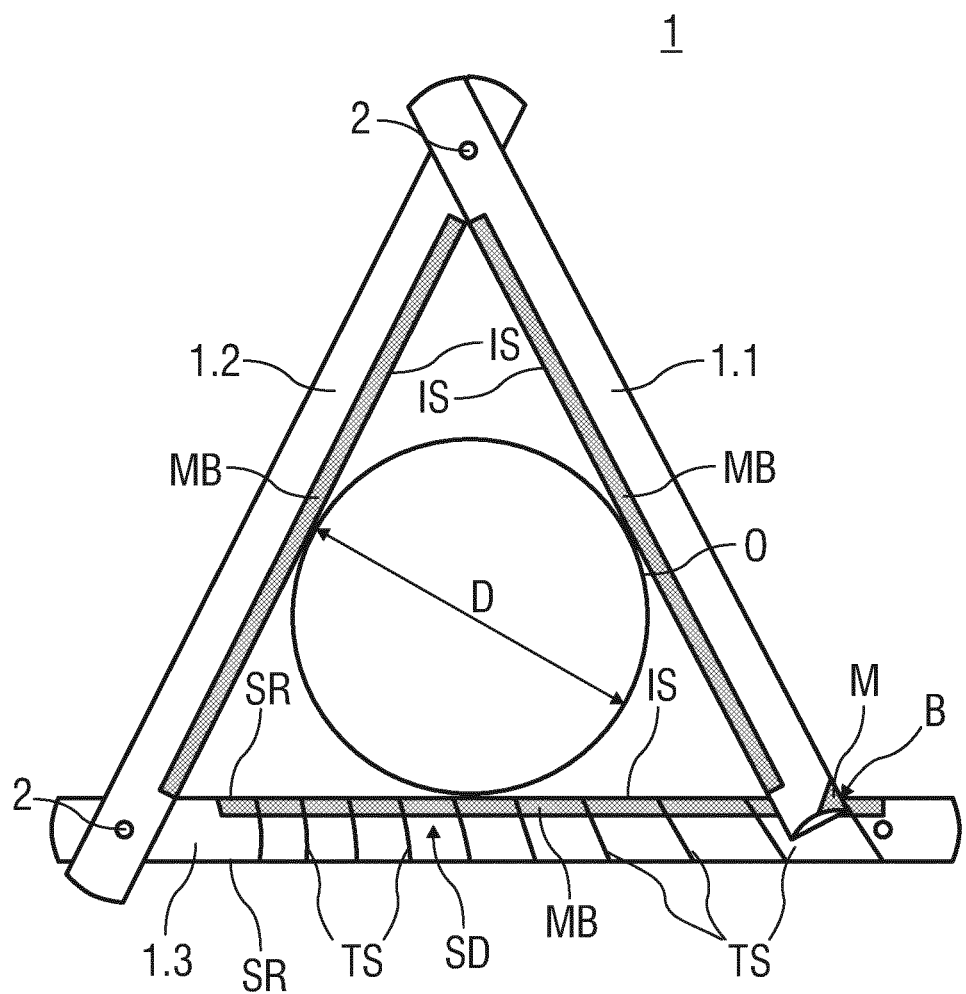

FOLDING RULE

CROSS-REFERENCE TO RELATED APPLICATION

This application is the U.S. national phase of PCT Application No. PCT/EP2013/055784 filed on Mar. 20, 2013, which claims priority to German Patent Application No. 10 2012 205 302.6 filed on Mar. 30, 2012, the disclosures of which are incorporated in their entirety by reference herein.

The invention relates to a folding rule according to the features of the preamble of claim 1.

Folding rules for measuring lengthwise dimensions are generally known from the prior art. Moreover, vernier calipers are generally known which permit a measurement of diameter values of objects.

CN 201 104 191 Y describes a foldable vernier caliper for determining the diameter of cylindrical objects. The vernier caliper has a measurement rule on which a first bearing element is arranged to be pivotable as far as a first abutment. A second bearing element is fastened pivotably on a carriage sliding on the measurement rule as far as a second abutment. To determine a diameter, the two bearing elements are pivoted as far as their abutment, the vernier caliper is placed with the first bearing element and the measurement rule onto the cylindrical object whose diameter is to be determined, and the second bearing element is pushed onto the cylindrical object by means of the carriage. The diameter of the cylindrical object is read off on the measurement rule.

A combined measurement rule is known from DE 834 904 B. A hinged measurement rule is provided with specially shaped additional members for the purpose of measuring depth and thickness. Individual members of the measurement rule are provided with catches for defining a right-angled triangle and with angle divisions. The ends of individual members are equipped with points for measuring distances.

The object of the invention is to make available an improved folding rule.

According to the invention, the object is achieved by a folding rule having the features of claim 1.

Advantageous embodiments of the invention are the subject matter of the dependent claims.

A folding rule comprises at least three links that are pivotably fastened to each other.

According to the invention, at least one of the links has at least one scale for measuring the diameter of objects, which scale is designed in such a way that, when the object is completely enclosed by three adjacent links, with inner sides of the three links each bearing on the object, a predefined area of one of the links bears on the scale and a respective contact point on the scale indicates the diameter of the object.

This folding rule permits measurement of the diameter of objects, in particular of round objects. It is not necessary that an end face of the object is accessible so as to be able to measure the diameter by placing the folding rule transversely across the end face, and instead the folding rule according to the invention allows a diameter to be measured, as described above, by complete enclosure of the object. This also permits measurement of the diameter of objects whose end faces are concealed and/or not accessible, for example in an installed state of the objects. Furthermore, this also in particular permits an exact measurement of the diameter of objects which have different diameters at various locations along their length such that, even if the end face of the object were to be accessible, the respective diameter would be able to be estimated only roughly by placing the folding rule onto the end face.

In contrast to this, the folding rule according to the invention is to be positioned at the particular location where the diameter of the object is to be determined, and the three adjacent links, which expediently have the same length, are then to be pivoted relative to each other in such a way that they completely enclose the object at this location, wherein the inner sides of the three links each bear on the object and a predefined area of one of the links bears on the scale. That is to say, the three links then form a triangle. At the contact point of the predefined area on the scale, the respective diameter value can then be read off exactly.

In order to ensure that the correct, i.e. predefined, inner sides of the three links are placed on the object, and to avoid inadvertently placing the outer sides of the links, opposite the inner sides, onto the object, these inner sides are preferably marked, for example by each having a colored marking. This is particularly advantageous since division lines of the scale do not extend perpendicularly with respect to the inner side of the link on which the scale is arranged or formed, but instead obliquely with respect to the inner side. It is therefore necessary to place the correct inner sides, i.e. the predefined inner sides, of the links onto the object in order to avoid measurement errors.

Moreover, by using the folding rule according to the invention, an additional measuring device for diameter measurement, for example a vernier caliper, is no longer necessary. This is especially so if the folding rule additionally has a length-determining scale, such that the generally known measuring tasks, in particular the measurement of a length, can then also be performed with the folding rule according to the invention. This reduces outlay in terms of costs, logistics and transport. For example, craftsmen then only need to carry one measuring device around with them instead of two different measuring devices in order to perform necessary measurements.

The link that has the predefined area is expediently the first link of the folding rule. This permits simple use of the folding rule and simple and exact positioning of the predefined area on the scale, such that a danger of incorrect measurements caused by incorrect use of the folding rule is greatly reduced.

In an advantageous embodiment, the link that has the scale for measuring a diameter is the third link of the folding rule. Between the link that has the marked area to be positioned on the scale and the link that has the scale, there must be a further link in order to close the triangle around the object. Therefore, the scale for measuring a diameter can of course also be positioned on the first link and the marked area can be positioned on the third link or, in the case of a folding rule with more than three links, further configurations would also be possible accordingly.

The scale preferably extends across a full width of the link in question. Division lines of the scale are formed on the link in such a way that, even when the predefined area is moved on the scale between side edges of the link, the respective diameter is indicated exactly and can be read off exactly. A precise positioning of the predefined area on the scale is therefore not necessary, and instead a positioning of the predefined area on the scale between the side edges of the link is already sufficient to carry out an exact measurement. Correct use of the folding rule is thus made easier, and a danger of incorrect measurements on account of incorrect use of the folding rule is greatly reduced.

The predefined area is expediently identified as a marking on the link in question. This marking can be colored, for example. In particular, this marking is preferably arranged in such a way that an edge of the link is exactly marked by the marking, which edge touches a respective division line or area of the scale that is to be read off. That is to say, this area, predefined for example by the marking, functions as a pointer for the scale, which pointer clearly indicates a respective area of the scale to be read off.

Advantageously, the predefined area is arranged or formed on a free end of the folding rule. In this way, a corner or a side edge in the area of the corner at the free end of the folding rule, i.e. at the free end of a first or last link of the folding rule, can be used as such a pointer. In this way, the free end of the folding rule can easily be positioned correctly on the scale, and the scale value, which in each case is indicated by the predefined area functioning as pointer, can be read off exactly on the scale.

In an advantageous embodiment, the scale for measuring a diameter extends across a plurality of links adjoining each other, wherein the folding rule has, before or after the links with the scale, a number of further links, of which one link has the predefined area, and wherein this number of the further links is at least twice as great as a number of the links with the scale for measuring a diameter. That is to say, the link having the scale, and forming one side of the triangle that encloses the object to be measured, is in this case composed of a plurality of subsidiary links which are not to be pivoted relative to each other but are instead to be oriented rectilinearly behind each other. The other sides of the triangle that encloses the object to be measured are in this case also each composed of a plurality of links oriented rectilinearly behind each other, which links then form subsidiary links of the respective link that forms a further side of this triangle. This also makes it possible to measure the diameter of larger objects.

That is to say, in this case the links which each form one side of the triangle enclosing the object to be measured are, as has been described, each composed of a plurality of subsidiary links of the folding rule, i.e. it is not then a case of pivoting each individual subsidiary link relative to adjoining subsidiary links, but instead a predefined number of mutually adjoining subsidiary links are then to be left oriented rectilinearly behind each other and then each form one of the three links that each form a side of the triangle enclosing the object to be measured. In this case, all three links expediently have the same number of subsidiary links.

The scale is expediently formed or arranged on a flat side of the link in question, and a length-determining scale is formed or arranged on an opposite flat side of the link and on adjoining flat sides of the other links. This also permits a length measurement by means of the folding rule, such that the folding rule performs two measuring functions, as a result of which a second measuring device, for example a vernier caliper, is redundant. By distributing the two scales on different flat sides of the folding rule, the danger of incorrect measurement, through using the wrong scale for the particular measurement, is reduced.

In an advantageous embodiment, the folding rule has two scales with different measurement units for measuring the diameter of objects. For example, one scale is designed as a scale with a metric measurement unit, and another scale is designed as a scale with a non-metric measurement unit, for example inches. This allows a diameter to be measured in two different measurement units. For example, the scale with the metric measurement unit is then formed in the area of one end of the folding rule, for example on the third link of the folding rule, and the scale with the non-metric measurement unit is formed in the area of the other end of the folding rule, for example on a third last link of the folding rule. Alternatively or in addition, it would also be possible for further scales to be arranged or formed on the other flat side of the folding rule, such that both flat sides would have one or more scales for measuring a diameter.

The folding rule is expediently made of wood, plastic and/or metal. This permits simple and inexpensive production of a robust folding rule.

Illustrative embodiments of the invention are explained in more detail below with reference to a drawing, in which:

FIG. 1 shows schematically an illustrative embodiment of a folding rule, which encloses an object in order to measure a diameter.

FIG. 1 shows schematically an illustrative embodiment of a folding rule 1, which encloses an object O in order to measure a diameter. This folding rule 1 comprises at least three links 1.1, 1.2, 1.3 which are pivotably fastened to each other and which each have the same length.

For the sake of clarity, only these three links 1.1, 1.2, 1.3 are shown here, these being necessary for the diameter measurement that is explained in detail below. The folding rule 1 can of course comprise further links not shown here which, for example, are then pivoted in such a way that they are positioned under one or more of the links 1.1, 1.2, 1.3 shown here. The pivotable fastening of the links 1.1, 1.2, 1.3 is in each case positioned in the area of end faces of the links 1.1, 1.2, 1.3 and designed as a pivot axis 2, via which two of the links 1.1, 1.2, 1.3 are in each case pivotably connected to each other. These pivot axes 2 are designed as rivets, for example.

In the example shown here, one of the links 1.1, 1.2, 1.3, namely the third link 1.3 of the folding rule 1, has a scale SD for measuring the diameter of objects O. As is shown in FIG. 1, this scale SD is designed in such a way that, when the object O is completely enclosed by the three adjacent links 1.1, 1.2, 1.3, with inner sides IS of the three links 1.1, 1.2, 1.3 each bearing on the object O, a predefined area B of the first link 1.1 bears on the scale SD and a respective contact point on the scale SD indicates a diameter D of the object O in question. In the example shown here with only three links 1.1, 1.2, 1.3, it is the first link 1.1 of the folding rule 1 that has this predefined area B. The predefined area B is here identified by a marking M which, for example, can be colored.

The predefined area B identified by the marking M is arranged or formed on a free end of the folding rule 1, i.e. on the free end of the first link 1.1. In the example shown here, the marking M is positioned in a corner between a side edge and an end face edge. This area identified by the marking M is to be positioned on the scale SD, and the diameter value is to be read off at the side edge area of the first link 1.1 identified by the marking M, i.e. at the predefined area B, which points to the respective diameter value on the scale SD. Through this arrangement of the predefined area B, the latter can be positioned easily and very precisely on the scale SD, and the side edge area identified by the marking M functions as a pointer that indicates the value to be read off on the scale SD. This value is in this way easy to read off.

The scale SD extends across a full width of the third link 1.3. As is shown in FIG. 1, division lines TS of the scale SD are formed on the third link 1.3 in such a way that, even when the predefined area B is moved on the scale SD between side edges SR of the third link 1.3, the respective diameter value is indicated exactly and can be read off exactly, i.e. the division lines TS are not oriented perpendicularly with respect to the side edges SR but instead obliquely, and some division lines TS are curved. This is necessary since, upon movement of the links 1.1, 1.2, 1.3 such that the predefined area B is moved between the side edges SR of the third link 1.3, but with the links 1.1, 1.2, 1.3 always bearing with their inner sides IS on the object O, the links 1.1, 1.2, 1.3 execute pivoting movements relative to each other. That is to say, the movement of the first link 1.1 relative to the third link 1.3 is not linear. Therefore, the division lines TS are also not linear, but instead curved, in order to permit an exact reading of the measured value of the diameter D at each position that the predefined area B is able to occupy on the scale SD.

To avoid measurement errors, the inner sides IS of the links 1.1, 1.2, 1.3 to be placed onto the object O are marked. In the example shown here, this is done by means of a preferably colored marking area MB, which extends along the predefined inner sides IS of the links 1.1, 1.2, 1.3 to be placed onto the object O. In this way, measurement errors are avoided, since it is ensured that the correct inner sides IS, i.e. the predefined inner sides IS, and not outer sides of the links 1.1, 1.2, 1.3 bear on the object O. Incorrect use, i.e. with the outer sides opposite the inner sides IS of the links 1.1. 1.2, 1.3 placed onto the object O, would cause a measurement error on account of the curved division lines TS extending not perpendicularly but instead obliquely with respect to the side edges SR of the third link 1.3, and on account of the then incorrect positioning of the predefined area B on the scale SD. This is prevented by the marking of the inner sides IS by means of the marking area MB.

The division lines TS not only have different curvatures but also a different spacing from each other. The scale in question here is a scale SD with a metric measurement unit, i.e. the scale SD is divided, for example, into centimeter values by means of the division lines TS. As a result of angle relationships of the triangle of the three links 1.1, 1.2, 1.3 enclosing the object O, the division lines TS for lower diameter values are closer together than the division lines TS for higher diameter values, i.e. the spacing between the division lines TS increases the greater the diameter values of the scale SD that are marked by the division lines TS. Advantageously, the scale SD also has further division lines (not shown here), such that it is also possible to measure a diameter accurate to a millimeter.

In the example shown here, the scale SD for measuring a diameter is arranged on a flat side of the third link 1.3. A length-determining scale is expediently formed or arranged on an opposite flat side (not shown here) of the third link 1.3 and of the other links 1.1, 1.2, i.e. on an underside of the folding rule 1 shown here. This means that this folding rule 1 not only permits measurement of the diameter D of objects O but also makes it possible to carry out length measurements, as is possible with folding rules known from the prior art. The folding rule 1 thus performs two measuring functions, as a result of which a second measuring device, for example a vernier caliper, or a folding rule known from the prior art, is redundant. The length-determining scale can be designed, for example, as a scale with a metric measurement unit, for example accurate to a millimeter, or as a scale with a non-metric measurement unit, for example inches.

In another advantageous embodiment not shown here, the folding rule 1 has two scales SD with different measurement units for measuring the diameter of objects O. For example, one scale SD, like the scale SD shown here, is designed as a scale SD with a metric measurement unit, and another scale (not shown here) is designed as a scale with a non-metric measurement unit, for example inches. This allows a diameter to be measured in two different measurement units. For this purpose, the folding rule 1 then advantageously has more than just the three links 1.1, 1.2, 1.3 shown here. For example, the scale SD with the metric measurement unit is then formed in the area of one end of the folding rule 1, for example on the third link 1.3 of the folding rule 1 as shown in FIG. 1, and the scale with the non-metric measurement unit is formed in the area of the other end of the folding rule 1, for example on a third last link of the folding rule 1. The predefined areas B applicable for each of the two scales SD are then both identified by corresponding markings M at the free ends of the folding rule 1.

In another advantageous embodiment not shown here, the scale SD for measuring a diameter extends across a plurality of links adjoining each other, wherein the folding rule 1 has, before or after the links with the scale SD, a number of further links, of which one link has the predefined area B, and wherein this number of the further links is at least twice as great as a number of the links with the scale SD for measuring a diameter. That is to say, the link having the scale SD, and forming one side of the triangle that encloses the object O to be measured, is then composed of a plurality of subsidiary links which are not to be pivoted relative to each other but are instead to be oriented rectilinearly behind each other. The other sides of the triangle that encloses the object O to be measured are then also each composed of a plurality of links oriented rectilinearly behind each other. These links then form subsidiary links of the respective link that forms a respective further side of this triangle.

This also makes it possible to measure the diameter of larger objects O. As has been described, the links which then each form one side of the triangle enclosing the object O to be measured are each composed of a plurality of subsidiary links of the folding rule 1, i.e. it is not then a case of pivoting each individual subsidiary link relative to adjoining subsidiary links, but instead in each case a predefined number of mutually adjoining subsidiary links are then to be left oriented rectilinearly behind each other and then each form one of the three links that each form a side of the triangle enclosing the object O to be measured. In this case, all three links expediently have the same number of subsidiary links.

The folding rule 1 permits measurement of the diameter D of objects O, in particular of round objects O. It is not necessary that an end face of the object O is accessible so as to be able to measure the diameter D by placing the folding rule 1 transversely across the end face, and instead the folding rule 1 illustrated allows the diameter to be measured, as described above, by complete enclosure of the object O. This also permits measurement of the diameter of objects O whose end faces are concealed and/or not accessible, for example in an installed state of the objects O. Furthermore, this also in particular permits an exact measurement of the diameter of objects O which have different diameters D at various locations along their length such that, even if the end face of the object O were to be accessible, the respective diameter D would be able to be estimated only roughly by placing the folding rule 1 onto the end face.

In contrast to this, the folding rule 1 illustrated is to be positioned at the particular location where the diameter D of the object O is to be determined, and the three adjacent links 1.1, 1.2, 1.3 are then to be pivoted relative to each other in such a way that they completely enclose the object O at this location, wherein the inner sides IS of the three links 1.1, 1.2, 1.3 each bear on the object O and the predefined area of the first link 1.1 bears on the scale SD on the third link 1.3. That is to say, the three links 1.1, 1.2, 1.3 then form a triangle. At the contact point of the predefined area B on the scale SD, the respective diameter value can then be read off exactly.

Moreover, by using this folding rule 1, an additional measuring device for diameter measurement, for example a vernier caliper, is no longer necessary. This is especially so if the folding rule 1 additionally has the length-determining scale, such that the generally known measuring tasks, in particular the measurement of a length, can then also be performed with the folding rule 1. This reduces outlay in terms of costs, logistics and transport. For example, craftsmen then only need to carry one measuring device around with them instead of two different measuring devices in order to perform necessary measurements.

LIST OF REFERENCE SIGNS

1 folding rule
1.1 first link
1.2 second link
1.3 third link
2 pivot axis
B area
D diameter
IS inner side
M marking
MB marking area
O object
SD scale for measuring diameter
SR side edge
TS division line

The invention claimed is:

1. A folding rule, comprising at least three links that are pivotably fastened to each other, wherein at least one of the links has at least one scale for measuring the diameter of objects, which scale is designed in such a way that, when the object is completely enclosed by three adjacent links, with inner sides of the three links each bearing on the object, a predefined area of one of the links bears on the scale and a respective contact point on the scale indicates the diameter of the object.

2. The folding rule as claimed in claim 1, wherein the link that has the predefined area is the first link of the folding rule.

3. The folding rule as claimed in claim 1, wherein the link that has the scale for measuring a diameter is the third link of the folding rule.

4. The folding rule as claimed in claim 1, wherein the scale extends across a full width of the link.

5. The folding rule as claimed in claim 1, wherein the predefined area is identified by a marking on the link.

6. The folding rule as claimed in claim 1, wherein the predefined area is arranged or formed on a free end of the folding rule.

7. The folding rule as claimed in claim 1, wherein the scale for measuring a diameter extends across a plurality of links adjoining each other, wherein the folding rule has, before or after the links with the scale, a number of further links, of which one link has the predefined area, and wherein this number of the further links is at least twice as great as a number of the links with the scale for measuring a diameter.

8. The folding rule as claimed in claim 1, wherein the scale is formed or arranged on a flat side of the link, and a length-determining scale is formed or arranged on an opposite flat side of the link and on adjoining flat sides of the other links.

9. The folding rule as claimed in claim 1, wherein the folding rule comprises two scales with different measurement units for measuring the diameter of objects.

10. The folding rule as claimed in claim 1, wherein it is made of wood, plastic and/or metal.

* * * * *